United States Patent

[11] 3,617,234

[72] Inventors Charles T. Hawkins
 Verona;
 Eugene W. Starr, Allison Park, both of Pa.
[21] Appl. No. 858,403
[22] Filed Sept. 16, 1969
[45] Patented Nov. 2, 1971
[73] Assignee PPG Industries, Inc.
 Pittsburgh, Pa.

[54] APPARATUS FOR CONDITIONING GLASS
 38 Claims, 18 Drawing Figs.
[52] U.S. Cl. .................................................. 65/337,
 65/338, 65/343, 65/134, 65/137, 65/135
[51] Int. Cl. ....................................................... C03b 5/22,
 C03b 5/16
[50] Field of Search........................................... 65/337,
 338, 134, 135, 137, 343

[56] References Cited
UNITED STATES PATENTS
1,631,204 6/1927 Hitchcock..................... 65/135 X

| 3,137,559 | 6/1964 | Van Praet..................... | 65/343 |
| 3,243,277 | 3/1966 | Brichard....................... | 65/137 |
| 3,317,300 | 5/1967 | Prislan......................... | 65/337 X |
| 3,457,059 | 7/1969 | Boettner....................... | 65/337 X |
| 3,515,529 | 6/1970 | Love et al..................... | 65/337 X |

*Primary Examiner*—Frank W. Miga
*Attorney*—Chisholm & Spencer

ABSTRACT: An improved gas impingement manifold for homogenizing a viscous liquid such as molten glass comprises a first inner tube, a second intermediate tube and a third outer tube which are concentrically arranged and mounted such that the first tube serves as a header or conduit for the gas, while the second and third tubes define a cooling jacket. The inner tube is provided with a gas bleed, while a plurality of water-cooled impingement nozzles are fixedly mounted between the second and third tubes.

In a preferred embodiment, the inner tube is composed of at least two axially aligned tube sections whose butt ends are continuously urged into pressing engagement.

FIG. 1

NO RESISTANCE - NO CONTROL SYSTEM

FIG. 2

FLOATER RESISTANCE SYSTEM

FIG. 3

FLOATER RESISTANCE SYSTEM
WITH GAS IMPINGEMENT TECHNIQUE (0° ANGLE)

FIG. 4

FLOATER RESISTANCE SYSTEM
WITH GAS IMPINGEMENT TECHNIQUE (NEGATIVE
ANGLE TOWARDS FORMING)

APPARATUS FOR CONDITIONING GLASS

BACKGROUND OF THE INVENTION

The present invention relates to an improved apparatus for creating and/or controlling flow in or homogenizing a liquid such as molten glass. More particularly, the present invention relates to an apparatus for impinging a gas such as air against the surface of a mass of molten glass in a container to initiate flow patterns therein and/or to control existing flow patterns and to effect exceedingly good homogenization thereof.

One of the most persistent problems inherent in the commercial production of quality glass is obtaining the desired degree of homogeneity. Different glass products require varying degrees of homogeneity, but all require a minimum amount. Many techniques have been employed with varying degrees of success to obtain the desired homogeneity. Optical glass tanks, for example, have incorporated mechanical stirrers. Plate, sheet, bottle and window glass tanks have utilized bubblers, mechanical stirrers, various strategically placed refractory members and varied tank designs.

Experience has taught large-volume bottle glass manufacturers, for example, that relatively large and relatively long glass melting tanks are required to consistently produce good quality, homogeneous glass on a continuous basis. Some tanks must also incorporate some means for retarding hot surface convective flow rates. Surface flow retardation is necessary to prevent a layer of hot surface glass from passing through the tank to the forming end at a speed too high for the glass to become homogenized and too high to condition the glass for forming. Typically, the means employed to retard the hot surface flow rates are surface skimmers and/or throats in the tank construction.

Because of the homogeneity requirement, the typical continuous glass melting tank design is expensive to construct and to operate. The sheer bulk of the tank refractories requires a considerable capital expenditure. The cost of operating the tank is also high because the design requires a huge volume of glass to be continuously maintained at elevated temperature. Glass manufacturers have long tried to design a smaller glass melting tank which would permit a high volume of quality glass to be produced. This objective has always been unattainable because of the time required to allow the convection currents in the glass mass to develop the required degree of homogenization. The objective could be attained, however, if the glass manufacturer could develop some means other than reliance on convection currents to homogenize the glass.

Recently, a technique for creating and/or controlling the flow patterns in molten glass has been disclosed. The technique involves the impingement of a stream or streams of a gas such as air onto the surface of molten glass with sufficient force to substantially change the surface flow patterns in the glass, if any, and to create and control surface flow patterns where none previously existed. This disclosure has taught that the degree of homogenization of glass is dependent not only upon the pressure of the impinging gas stream, but also upon the temperature of the gas, the angle of incidence of the gas stream relative to the molten glass surface, the temperature of the glass, the symmetry of the gas stream pressure relative to the surface of the glass, and the like.

Although this technique has somewhat diminished the need to rely on convection currents and prolonged residence time in a tank to effect homogenization of molten glass, it has met with only limited commercial success. This limited success is attributed, among other things, to the difficulty of maintaining a desirably uniform gas impingement pressure, the difficulty of maintaining a uniform temperature distribution in the glass, the high susceptibility to deterioration of the gas impinging apparatus and the difficulty of coordinating the numerous parameters involved. For example, the normally high temperatures to which the impingement apparatus is subjected cause a rapid deterioration of the gas impingement nozzles. This deterioration, which involves both the erosion and/or plugging of one or more gas impingement nozzles, tends to cause a variable gas impingement pressure profile and to cause stones or ream in the resulting glass product. These defects are compounded by the fact that the gas impingement temperature normally decreases by about 60° F. per lineal foot of apparatus. This causes variations in the surface temperature of the molten glass and results in the glass having a nonuniform viscosity and density. Obviously, the homogenization or surface defect attenuation of molten glass having a variable viscosity will be most difficult.

As should be apparent, the primary deficiencies in the above-discussed gas impingement technique are caused by deficiencies in the apparatus employable therewith. Accordingly, there still exists the need for commercially practicable apparatuses or devices capable of effecting efficient glass homogenization without the inherent difficulties of the prior art.

SUMMARY OF THE INVENTION

The present invention contemplates new and improved apparatuses for impinging a stream or streams of a gas such as air longitudinal the surface of molten glass which will effect exceedingly high degrees of glass homogeneity, yet which will obviate the above-described prior art deficiencies.

One advantage of practicing the present invention in a glass melting tank is that it provides a substitute for various other commonly employed mechanical homogenizing means. Another advantage is that the present invention can also be operated to resist or enhance the naturally occurring convective flows in the glass tank. A third advantage is that the present invention provides a substitute for the refractory members presently incorporated in tank designs to control molten glass flow, such as skimmers or floaters. Eliminating the mechanical stirrers and the refractory skimmers or floaters eliminates the possibility of contamination, which is always present when solid members are immersed in molten glass. However, the present invention can also be used in conjunction with skimmers, floaters, bubblers and stirrers when it is desired to combine the advantages of each.

The apparatus of the present invention includes a generally tubular, composite gas impingement manifold which is axially rotatable to permit gas impingement at a selectively predetermined angle of incidence. The manifold comprises a first inner tube or pipe, a second intermediate tube and a third outer tube. The first, second and third tubes are concentrically arranged and mounted such that the first tube serves as a header or conduit for the gas, while the second and third tubes define a cooling jacket.

The first or innermost tube is provided with a gas inlet opening or port and a gas bleed or outlet opening; the bleed, as described more fully hereinbelow, is essential for maintaining a desirably uniform and symmetrical gas impingement pressure and temperature distribution.

An insulating material such as, for example, Carborundum Fiberfrax paper Type 970-J, separates the first and second tubes, while dividers may be provided between the second and third tubes to partition the cooling jacket into separate compartments.

A row of nozzles, preferably of a heat-resistant ceramic material such as fused aluminum silicate or alumina, is fixedly mounted between the second and third tubes. As discussed below, the location of the nozzles remote from the first tube facilitates their cooling and thereby greatly decreases the likelihood of their deterioration. The nozzles are preferably arranged in a single row in a symmetrical pattern with reference to the centerline between the sidewalls of a glass tank. The arrangement is such that gas is impinged transversely of a major surface flow within the tank and essentially from wall to wall. However, it is often desired that the nozzles extend only partially across the glass surface, and that the nozzles farthest from the centerline between the walls of the tank be spaced a predetermined distance therefrom.

The internal channel in each nozzle is fluid communication with the interior of the first tube. Such communication may be accomplished, for example, by providing at least one discharge aperture in the wall of the first tube or by providing a longitudinal slot or cutout therein. Similarly, the insulation material between the first and second tubes is provided with a passageway communicating with the interior of the first tube and the interior of the nozzles.

BRIEF DESCRIPTION OF THE DRAWINGS

The invention will be more fully understood by reference to the following detailed description of specific embodiments thereof taken in conjunction with the drawing wherein.

DETAILED DESCRIPTION

As used in this specification and appendant claims, the term "homogenization" is meant to describe a mixing or texturing action which renders molten glass of substantially uniform composition throughout. The term is also meant to describe a shearing action which attenuates the plano-parallel striae layers in molten glass so as to permit enhanced reduction of defects by a diffusion mechanism. The term "angle of gas stream impingement" is meant to describe the angle subtended by a line normal to the molten glass surface and a line parallel to the direction of gas stream flow. Positive angles are those which result when the direction of gas stream impingement is opposed to the natural surface flows in a tank. Positive angles of gas stream impingement retard existing surface flows. Negative angles are those which result when the direction of gas stream impingement is in the same direction as the natural direction of surface flow in the tank. Negative angles accelerate the surface flow rates.

Figure 1:
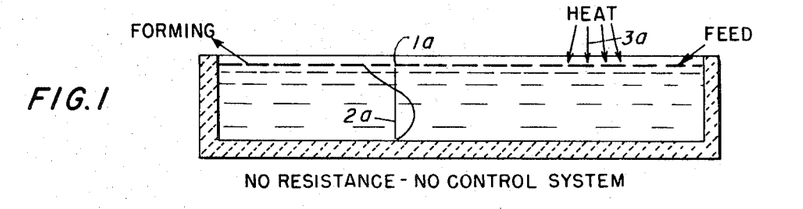
FIG. 1 schematically represents a no-resistance, no-control velocity profile illustrating the direction and magnitude of the convective flow in a molten glass container.
Figure 2:
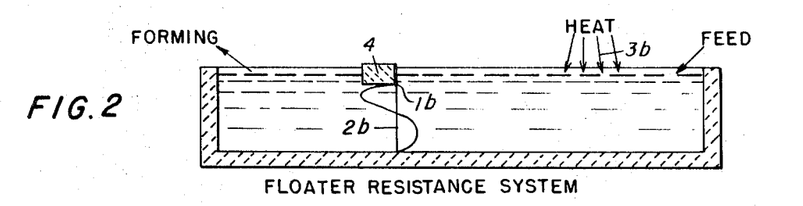
FIG. 2 represents a floater resistance controlled velocity profile.

Referring now to the drawing, FIGS. 1 and 2 illustrate glass systems of the type normally treated by the gas impingement apparatus of the present invention. In the no-resistance system of FIG. 1, the surface flows determined at point 1a are toward the forming end of the tank. The flows at lower levels in the glass mass at point 2a are toward the batch feed end of the tank. This convective flow pattern results in the no-resistance system because heat is applied in area 3a of the tank to melt the batch materials. As the batch melts, the molten glass in the approximate center of the tank becomes the hottest glass in the tank melter. This hot glass exhibits a lower density than the cooler molten glass in other portions of the tank. The lower-density hot glass floates on the surface of the cooler glass mass and flows from the hottest point, or spring zone, toward the forming end of the tank in one direction and toward the feeding end in the other direction. The no-resistance flow system is undesirable because the hot surface glass moving toward the forming end can spend too short a residence time in the tank to allow bubbles in the molten glass to fine out. One result of the no-resistance flow system can be a high seed count in the final glass produced. Another result of the no-resistance control system can be inadequate temperature conditioning for satisfactory forming.

The present commercial practice to increase the residence time of the glass in the tank is to introduce a refractory skimmer 4, as indicated in FIG. 2. The residence time of the molten glass in the tank is increased because the glass must flow underneath the skimmer. The velocity profile in the glass is changed by the introduction of the skimmer which provides another surface of zero velocity 1b. It is also displaced downward into the glass mass.

Figure 3:
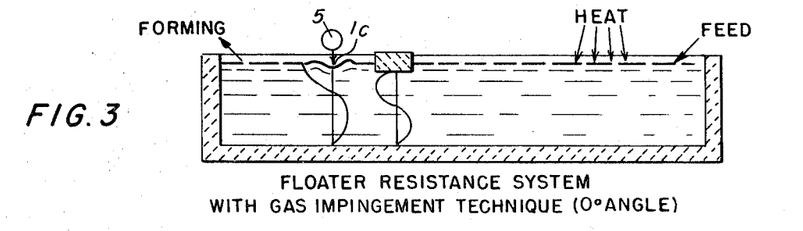
FIG. 3 represents the controlled velocity profile produced by the apparatus of the present invention operated to impinge gas in a direction normal to surface flow.

FIG. 3 indicates the effect of operating the gas impingement apparatus 5 of the present invention at 0° angle, that is, normal to the glass surface. As shown in FIG. 3, the velocity profile at point 1c is not greatly different from the no-resistance type of velocity profile, while the skimmer exerts its influence independently exactly as in FIG. 2.

As shown, the impingement of gas in a symmetrical pattern normal to the surface creates a visible depression or trough with noticeable mounds up and downstream thereof. The thrust of the gas upon the surface creates a wave disturbance which, in turn, creates circulation in depth about a transverse axis in the glass mass. These actions introduce shear and produce homogenous, and high quality glass. It should be noted that since the apparatus does not directly contact the molten glass, it cannot introduce refractory stones or produce ream by contact, as is occasionally done by a refractory skimmer.

Figure 4:
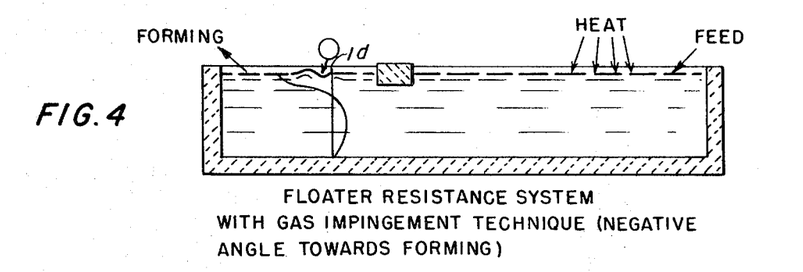
FIG. 4 represents the controlled velocity profile produced by impinging gas at a substantial negative angle to the direction of surface flow according to the present invention.

FIG. 4 illustrates application of gas at a substantially negative angle, such as −30°, and the effect thereof on the velocity profile at point 1d. For equal force applied, the mound or crest illustrated is higher than that produced in FIG. 3. The surface velocity is accelerated downstream and the depth of circulation is more pronounced, thereby creating more shear.

It will be appreciated that when employing the present gas impingement manifold, the count of strain-causing cords, striae, ream and blisters, each of which results from glass inhomogeneity, depends upon the impingement angle, gas temperature, gas pressure, nozzle orifice size and the distance of the end of the nozzle orifice above the molten glass surface. It will also be appreciated that a proper selection of these parameters will increase glass yields (percent pack).

Generally speaking, the impingement angle may vary from about +30° to about −80°, depending upon whether the impingement function is one of surface flow retardation or homogenization, respectively. In this regard, a gas stream angle of incidence of from about −10° to about −30° is particularly suitable for homogenizing molten bottle glass in a forehearth region of a bottle glass tank. At an angle more positive than −10°, the gas stream energy is dissipated to lesser advantage and throughout glass is somewhat improperly sheared. On the other hand, when a stream of gas is impinged at an angle more negative than −30°, the stream expands too much before striking the glass surface. The energy of the excessively expanded stream is poorly distributed and fails to maintain proper plano-parallel striae layers in the molten glass.

The preferred temperature of the impinging gas stream depends upon the melting characteristics of the glass involved, the firing techniques and the geometry of the melting tank being employed. For some purposes, the gas stream temperature should preferably be within about 25° F. of the temperature of the molten glass. In commercial glass-making operations, this temperature is between approximately 1,900° F. and 3,500° F. The gas, however, can be introduced in many instances at room temperature (75° F.) if the heat sink developed by operating the apparatus at this relatively low temperature is not detrimental to the operation or is compensated for by other heating means in the tank. In this regard, it should be noted that when desired a preselected relatively low gas temperature may be utilized to effect a cooling of the glass. In order to prevent excessively low-temperature glass from reaching the forming end of a glass tank, gas burners or electric heaters may be installed downstream from the gas impinging apparatus to control the heat sink.

In general, however, the higher the temperature of the gas utilized in the apparatus, the greater the overall efficiency of the operation, including increased homogenization and control over the final glass quality. For example, gas temperatures in the range of 1,900°–2,400° F. are preferred for the production of highly homogeneous bottle glass since below about 1,900° F. the gas stream would have relatively insufficient energy to accelerate and agitate the molten glass, while above about 2,400° F. the energy density of the gas stream normally exceeds a critical value so that glass wave formation occurs at an excessive rate.

The orifice or channel diameter of the nozzles employable with the present apparatus may vary, but diameters of from about one-sixteenth inch to about one-fourth inch are preferred. Below about one-sixteenth inch too much air is entrained with the gas stream thereby reducing the energy flux density thereof below levels sufficient for wave formation. Orifice diameters greater than about one-fourth inch may cause an overlap of adjacent gas streams or otherwise create excess local momentum flux densities and tend to disturb the plano-parallelism of striae layers. The plano-parallelism of striae layers will also be disturbed if one or more nozzles become plugged. Such plugging will result in a nonuniform gas impingement pressure profile and a combination of transverse and longitudinal circulation in the glass. A minimum nozzle length to orifice diameter ratio of 5:1 is preferred.

The workable gas pressure range is dependent upon the nozzle orifice diameter. For example, when nozzles having a ⅛-inch orifice are employed, the workable pressure is from about 40 to about 160 ounces per square inch over atmospheric pressure. Hereinafter, the abbreviation ("osig") will be used to describe the pressure in ounces over atmospheric pressure. Excessively high gas pressures, though they result in increased surface shear action, result in excessive surface turbulence which causes bubbles to be trapped in the molten glass. Ordinarily, when nozzles having an orifice of about one-eighth inch are employed, pressures above about 160 osig. tend to cause striae malorientation, while pressures below about 40 osig. ordinarily result in inadequate homogenization and control over the surface flows since the gas stream has insufficient momentum to attenuate defects. The gas pressure can be varied, however, for specific purposes other than homogenization and surface flow control, such as control of the tank atmosphere, between about 10 ounces and 650 ounces osig. if desired.

When the above-mentioned parameters are kept constant and only the distance between the nozzle orifices and the surface of the glass varied, the following results are observed. As the distance between the nozzles and glass is increased the streams emanating from the nozzles expand excessively and overlap, thereby reducing the intensity of the momentum flux density in the direction necessary to accelerate the glass for proper defect attenuation. In this regard, a distance of about 6 inches between the nozzles and the surface of the glass is a practical upper limit, but a maximum distance of about 5 inches is preferred. Decreasing the distance below about 1 inch causes glass surface depressions or waves which are too deep for proper homogenization. When the depressions are excessively deep, the walls thereof tend to collapse and thus create nonplanar flow patterns and inclusion of gases into the molten glass. In most applications of the present invention, the preferred height of the nozzles is from about 1 inch to about 3 inches above the surface of the glass.

Figures 5, 6, 7:
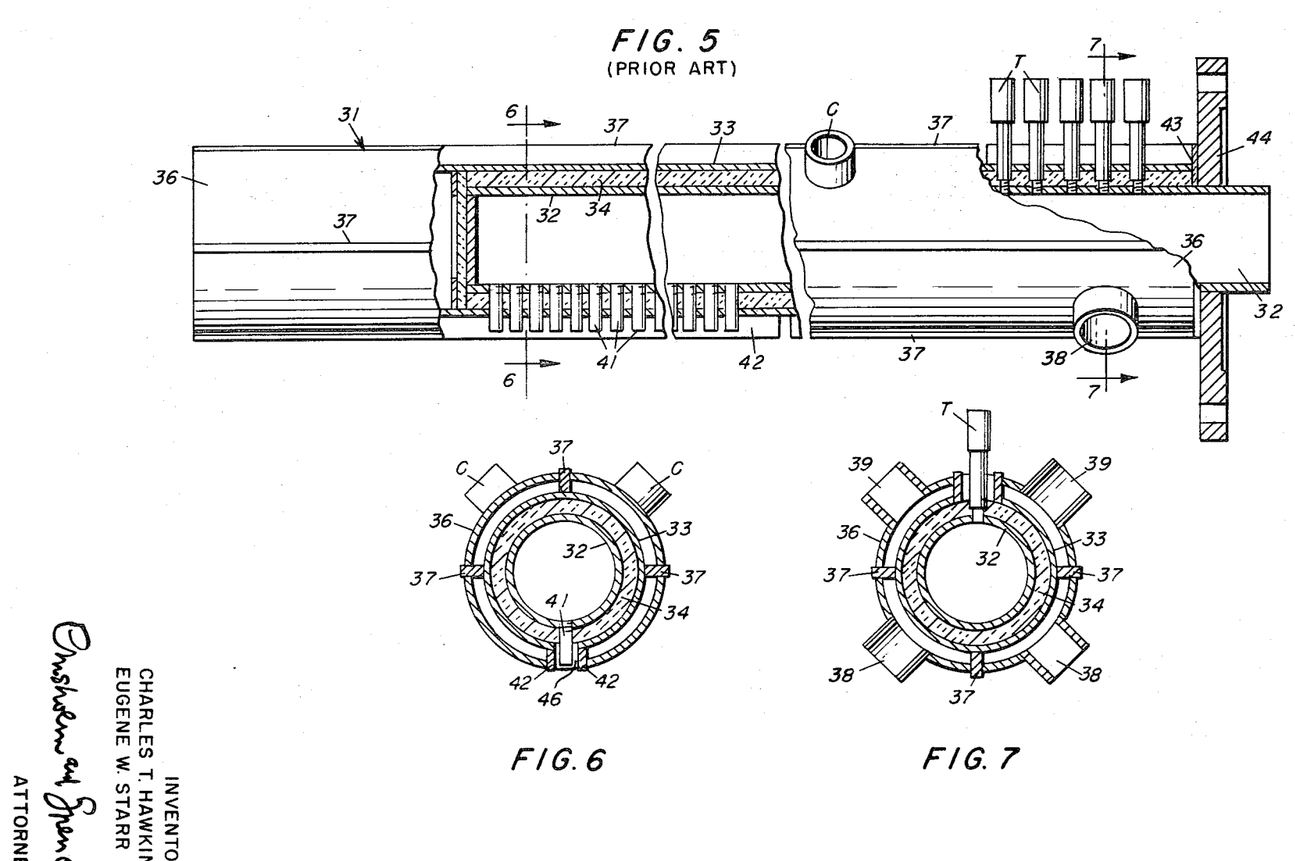
FIG. 5 is a longitudinal, partial sectional view, with portions removed for the sake of clarity, of a prior art gas impinging apparatus for purposes of illustrating the advantages of the present invention.
FIG. 6 is a sectional view taken along line VI—VI of FIG. 5.
FIG. 7 is a sectional view taken along line VII—VII of FIG. 5.

The significance of the foregoing and the relative advantages of the present invention can be more fully understood by a consideration of a prior art gas impingement apparatus. Such prior art apparatus is illustrated in FIGS. 5, 6 and 7. With reference to FIG. 5, there is shown a gas impingement manifold 31 consisting of two concentric pipes, the inner pipe 32 being a 3-inch internal diameter pipe, and the outer pipe 33 being a 5-inch internal diameter pipe. The inner pipe serves as a conduit for the gas used, preferably air at or near the temperature of the molten glass in the region undergoing treatment. The material of construction usually limits the upper temperature of the impinging gas, but as indicated above gas at temperatures as low as ambient room temperature, or about 75° F., may be employed.

Separating the inner pipe 32 and outer pipe 33 is a refractory insulating material 34 such as Carborundum Fiberfrax tube Type T30-R. Concentrically disposed about the gas supply pipes is an outer shell 36 of stainless steel so arranged as to function as a jacket for cooling water. The space between pipe 33 and shell 36 is divided into four isolated compartments by watertight welding of spacers or dividers 37 to the two concentric elements. Two of the compartments are connected to water inlets 38 and the remainder to water outlets 39.

As shown in FIGS. 5 and 6, a row of linearly aligned nozzles 41 are tapped into pipe 32 and extend into a longitudinal recess in the walls of pipe 33 and shell 36. The recess is bordered by welded joint panels 42. A backup ring 43 is welded in watertight relationship to the butt end of pipe 33 and shell 36, after which a circular flange 44 is welded to the circumference of pipe 32 about 1½ inches from the end thereof.

The outer shell 36 extends beyond the extremities of pipes 33 and 32 as shown in FIG. 5. Each pipe is sealed by a welded plate at the extremity and buttressed with Fiberfrax or some similar insulation.

Half couplings C,C are welded to shell 36 to facilitate in rotation as hereinafter described. Elements T are thermocouple extensions.

As illustrated clearly in FIG. 6, the nozzles 41 in the prior art manifold 31 are fixedly mounted on the inner pipe 32 and are separated by an air space 46 from the cooling jacket defined by the shell 36 and the outer pipe 33. It should be noted that this structural arrangement does not provide for adequate cooling of the nozzles. Accordingly, if the ends of the prior art nozzles are maintained at a distance of about 3 inches from the surface of the glass being treated, rapid deterioration results. In contrast, the nozzles of the present invention may generally be disposed within 1 inch of the molten glass surface without any serious danger of deterioration.

Figure 8:
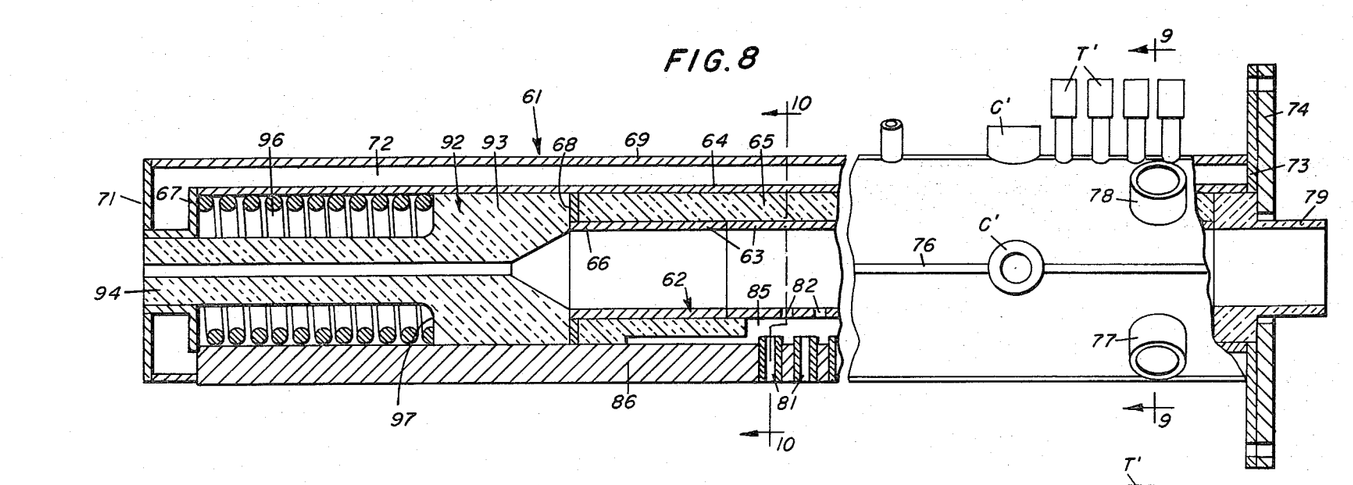
FIG. 8 is a longitudinal, partial sectional view, with portions removed for the sake of clarity, of a gas impingement manifold embodying the principles of the present invention.
Figure 11:
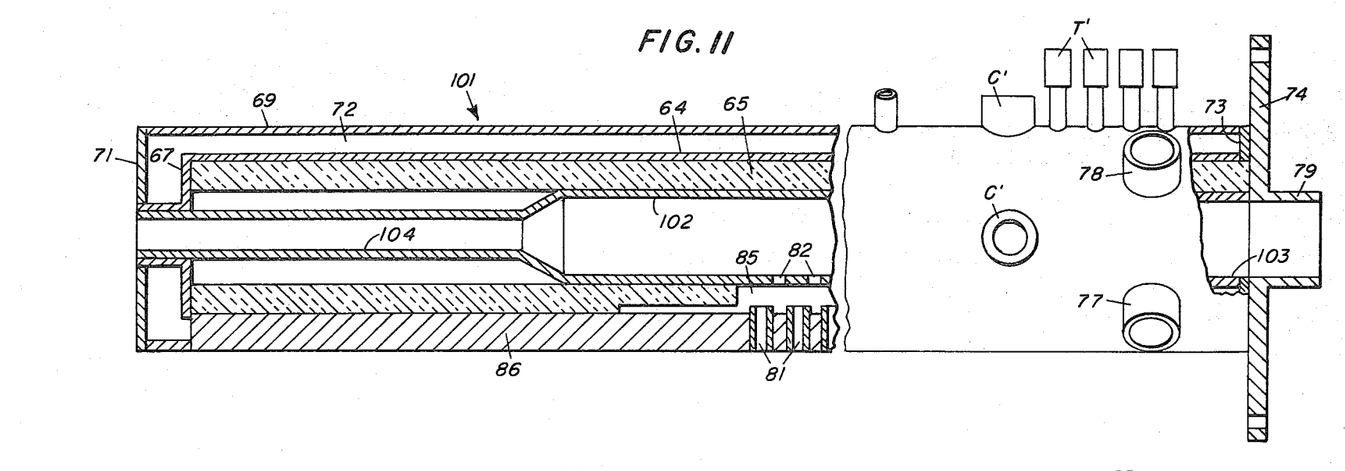
FIG. 11 is a longitudinal, partial sectional view of another gas impingement manifold in accordance with the present invention.

Referring now to FIGS. 8 and 11, there are shown two gas impingement manifolds 61 and 101, respectively. Each embodies the principles of the present invention. As illustrated in FIG. 8, the manifold 61 comprises an inner pipe or tube 62 composed of at least two axially aligned tube sections 63,63. The tube sections 63 may be fabricated from stainless steel or the like, but fabrication from a heat-resistant ceramic material such as Mullite (fused aluminum silicate) or fused alumina is preferred. The internal diameter of the tube 62 may be about 3 inches. As in the prior art device, the inner tube 62 serves as a gas conduit.

Figure 9:
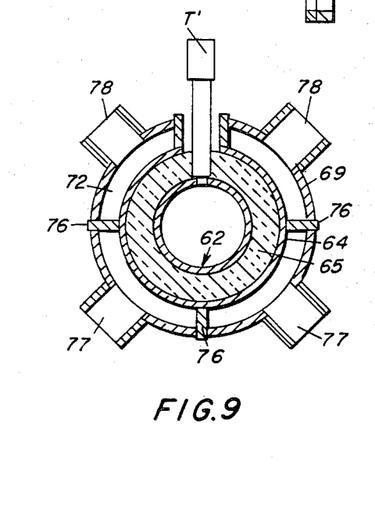
FIG. 9 is a sectional view taken along line IX—IX of Fig. 8.

An intermediate tube 64 having an internal diameter of about 5 inches is disposed concentrically about the inner tube 62 and is separated therefrom by an insulation material 65 such as Fiberfrax. The intermediate tube 64 extends beyond the outlet end 66 of the inner tube 62 and has a flange 67 welded to the extended end thereof. An annular backup ring 68 is welded to the internal wall of tube 64. The ring 68 abuts against both the periphery of the inner tube 62 and the end of the insulation separating the inner and intermediate tubes. Concentrically disposed about the intermediate tube is an outer tube or shell 69. The shell 69 may be composed of a heat resistant metal such as stainless steel, Iconel, Inconel coated stainless steel or the like. A circular flange 71 is welded to the butt end of the shell 69 and to the periphery of the flange 67 to partially define a cooling jacket 72. The remainder of the cooling jacket is defined by an insulating backup ring 73 joined in watertight relationship to the butt end of tube 64 and shell 69. As shown in FIG. 9, the cooling jacket 72 is divided into four isolated compartments by watertight welded dividers 76. Two of the compartments are connected to water inlets 77 and the remaining two to water outlets 78. The number of compartments is a matter of choice and fewer or greater than four compartments may be provided.

A ceramic extension tube 79 is positioned between the butt end of tube 62 and a circular flange 74 to facilitate the introduction of the impingement gas into the interior of the inner tube 62. Half couplings C',C' are welded to the shell 69 to facilitate rotation of the manifold 61 which, in turn, changes the angle of incidence of gas impingement upon the surface of the glass being treated. Elements T' are thermocouple extensions.

Figure 10:
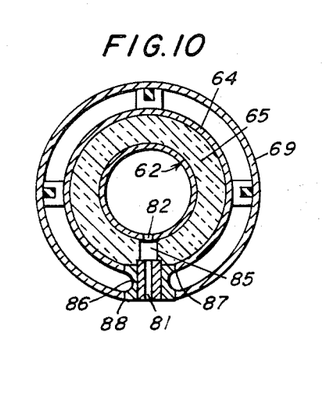
FIG. 10 is a sectional view taken along line X—X of FIG. 8.
Figure 13:
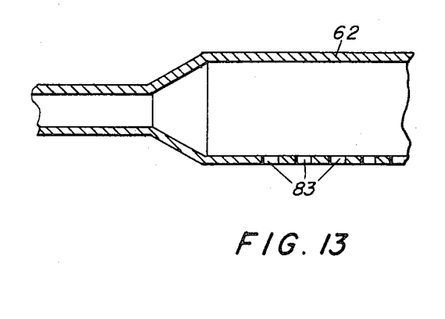
FIG. 13 is a partial sectional view of one embodiment of the first inner tube of the present gas manifold.
Figure 14:
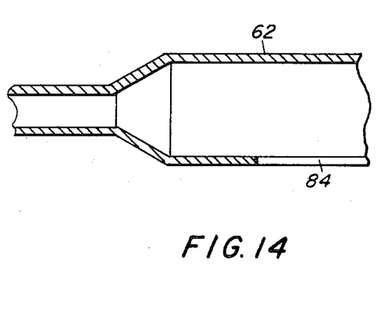
FIG. 14 is a partial sectional view of another embodiment of the first inner tube.

As shown in FIG. 8, and particularly in FIG. 10, a row of nozzles 81 is disposed between the walls of tube 64 and shell 69. The nozzles may be aligned with discharge apertures or ports 82 in the wall of inner tube 62, but such alignment is not critical. The nozzles 81 communicate with the discharge apertures 82 through an opening 85 in the insulation between the inner and intermediate tubes. As illustrated in FIGS. 13 and 14, the discharge aperture 82 may comprise a plurality of holes 83 or a longitudinally extending slot 84. In this connection, it will be appreciated that the use of a slot 84 will minimize the effects of any thermal expansion of tube 62 on the alignment of the gas discharge aperture 82 with the nozzles 81.

The nozzles, which may comprise any suitable heat-resistant material, such as fused aluminum silicate or alumina, are bonded to a metal insert bar 86 which, in turn, are welded in suitably disposed openings 87 and 88 in the walls of tube 64 and shell 69, respectively. The nozzles 81 may be bonded to the metal insert bar by first coating then with a suitable cement, such as that sold by the Aremco Products Company under the trade name Ceramabond, and then push-fitting each of them into an internal channel in the insert bar. In the alternative, the nozzles may be push-fit into the insert channels and the corners 86' of the insert channels peened or provided with shoulders so as to overlie the edges of the nozzles.

A bleed tube 92 is biased against the annular backup ring 68 and the butt edge of the outlet end 66 of the tube 62. As shown in FIG. 8, the bleed tube comprises a piston-shaped member having an enlarged gas inlet section 93 and an elongated necked-down exhaust section 94. The necked-down section 94 is slidably mounted in the opening of flange 67 to allow for thermal expansion of the inner tube 62. The bleed tube may comprise any suitable heat-resistant material, with a fused ceramic material such as aluminum silicate or alumina being preferred. It will be appreciated that the combined absence of nozzle mountings on the wall of the inner tube and the slidable bleed tube mounting effectively avoid subjecting the nozzles 81 to undesirable stressing. It will also be appreciated that the bleed tube 92 effectively avoids an increase in the pressure of the gas emanating from the nozzles closest to the outlet end 66 of the tube 62 and provides for excellent temperature uniformity along the length thereof.

As shown in FIG. 8, a compressed spring 96 is mounted circumferentially about the necked-down section 94 of the bleed tube. The spring 96 is seated between the flange 67 and a shoulder 97 provided on the inlet section 93. The spring continuously urges the end of the bleed tube against the outlet end 66 of the inner tube 62 and thereby maintains the separate tube sections 63 in pressing engagement. Any means suitable for maintaining tube section contact may be substituted for the spring 96. A seal (not shown) may be provided between the ring 68 and the bleed tube 92 to prevent hot gas from reaching the spring 96 and possibly causing damage thereto.

Figure 12:
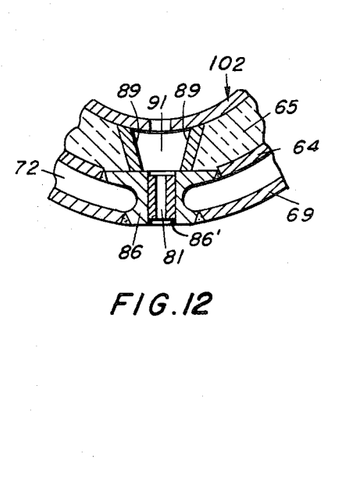
FIG. 12 is a sectional view illustrating one nozzle-tube arrangement employable with the manifold shown in FIG. 11.

In an alternative embodiment of the gas manifold 61, the long life and durable water-cooled nozzles 81 may be combined with the simplicity of an all-metal, unitary inner tube. As shown in FIG. 11, a gas manifold 101 is equipped with a unitary inner tube 102 having an inlet end 103 and an elongated necked-down bleed end 104. As is the case with manifold 61, the inner tube 102 is separated from an intermediate tube 64 by a layer of insulating material 65. However, since there is no need for a separate bleed tube, the insulation material extends the complete length of the intermediate tube. The insulation may again be Fiberfrax or an equivalent thereof. Since the inner tube 102 is not composed of separate sections, there is no need for a biasing spring. Consequently, no spring is provided. The remainder of the manifold 101 substantially corresponds to the manifold 61 and, for the sake of brevity, will not be described in detail. However, in a preferred embodiment, the nozzles are both cemented and peened in place. FIG. 12 illustrates an alternative structure for supporting the inner tube 102. In this embodiment, metal spacers 89,89 are welded to the metal insert bar 86. The spacers 89 provided support for the inner tube 102 and define a gas channel 91 from the interior of the inner pipe 102 to the nozzles 81.

Figure 15:
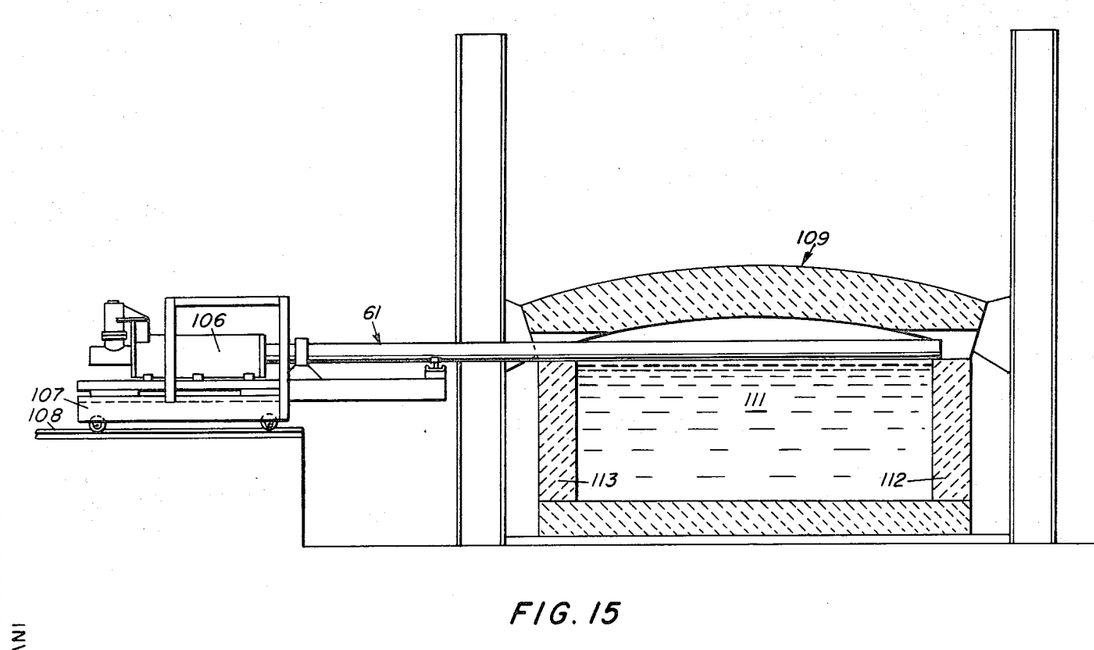
FIG. 15 is a partial, cross-sectional, elevational view of a glass furnace illustrating the manner in which the present apparatus may be mounted relative thereto.

During operation, the gas manifold 61 and/or 101 is coupled to a source of air or other gas. Typically, the air source comprises a cylindrical excess air-gas burner in which the output is fed into the inlet of the manifold. Such a burner, illustrated schematically as 106 in FIG. 15, is commercially available. As shown, the burner 106 is so mounted as to be concentric with manifold 61 and to be adjustably rotatable so that the nozzles of the manifold can be aligned at any desired angle with respect to the horizontal. Such a burner-manifold combination is conveniently mounted on a roller frame 107, in turn guided by tracks 108, for introduction and removal from a furnace 109. The tracks and roller frame are so arranged that the manifold is adjustably disposed a preselected distance above the surface of the glass 111, while the nozzles are disposed symmetrically with respect to the furnace walls 112 and 113.

The present invention will be more readily appreciated by making reference to the following examples.

EXAMPLE 1

To demonstrate the advantages of the present invention, the following study was conducted on a bottle glass refiner and forehearth combination of the continuous melting type in which a batch was introduced continuously at a feeder end of the refiner and a plurality of bottle-making machines were fed at the forming end of the forehearth. As illustrated schematically in FIGS. 16 and 17, the refiner 114 was rectangular in shape. It was about 4½ feet long and about 7½ feet wide. The depth of the molten glass in the refiner was approximately 3½ feet. The refiner was equipped with two firing ports (not shown) located in the melting zone thereof. The ports were gas fired. The forehearth 116 was contiguous with the refiner and of rectangular shape. The length and width of the forehearth were about 20 feet and 21/6 feet, respectively. The depth of the glass in the forehearth was approximately 6 inches. The forehearth was equipped with a skimmer 117 located near the refiner end thereof. A gas impingement manifold 61 was located about 2½ feet downstream from the skimmer 117 in the manner shown in FIG. 15. The inner tube 62 of the manifold 61 was 1¾ inches in outside diameter and comprised two sections 63. The sections 63 were made of fused aluminum silicate. The intermediate tube 64 was composed of stainless steel and had an outside diameter of 3 inches. The outer tube or shell 69 was composed of stainless steel and had an outside diameter of 4 inches. The inner tube 62 served as the header or conduit for the gas and was provided with a multiplicity of discharge apertures 82, which allowed the gas to pass from the interior of the inner tube through the manifold structure to the exterior of the shell 69. The apertures 82 were aligned parallel to the axis of the inner tube 62. A plurality of Mullite nozzles 81, each bonded to a metal insert bar 86, were welded between the intermediate tube 64 and shell 69. During operation, the interior channels of the nozzles were substantially aligned with the discharge apertures and communicated therewith through a slot 85 in the insulation 65 separating the inner and intermediate tubes. It was found, however, that no particular need to align the nozzles with the discharge apertures existed. Cooling water was supplied to inlet 77 and circulated between the walls of the intermediate and outer tubes 64 and 69, respectively. The water came into direct contact with the metal insert bar 86 and thus provided excellent cooling of the nozzles. Water was then returned through outlet 78. Dividers 76 were provided between tubes 64 and 69 to divide the cooling jacket into separate compartments.

The manifold 61 was equipped with a Mullite exhaust tube 92 which was spring biased against the edge of the tube section 63 closest thereto. The spring 96 had a load of 30 pounds, a mean diameter of 2.45 inches, 12 active coils and a free length of 8 inches. The spring took up the thermal expansion of the inner tube 62 and continuously urged the sections 63 into pressing engagement. Hot air was bled off from the exhaust tube at the end of the assembly. This provided for a better temperature and pressure distribution along the inner tube and enabled foreign particles to be discharged therefrom. The overall length of the manifold was 4 feet, of which only a 22-inch segment thereof substantially centered over the forehearth was provided with gas impingement nozzles. The nozzles had a ⅛-inch inside diameter, were located one-half inch apart on their centers and were 45 in number.

Figure 16:
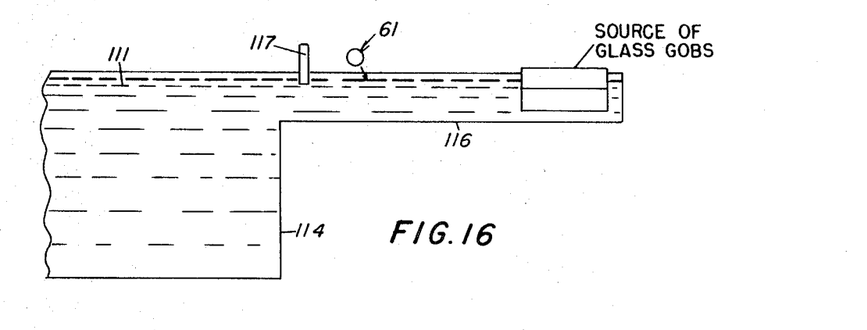
FIG. 16 is a partial elevational view illustrating the use of a gas impingement manifold in accordance with the present invention in conjunction with a bottle glass tank.
Figure 17:
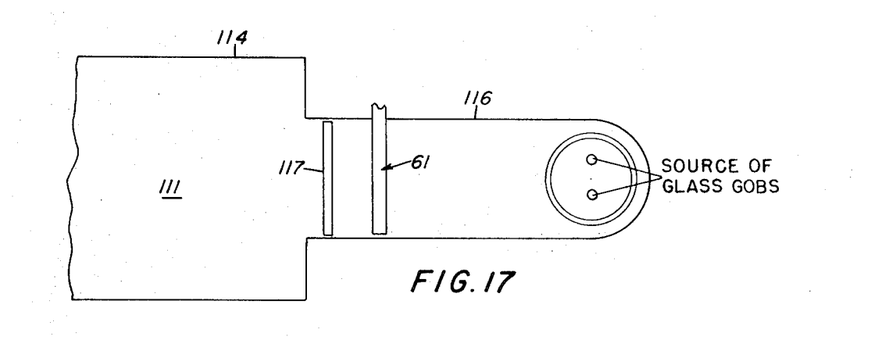
FIG. 17 is a plan view of the manifold-tank arrangement shown in FIG. 16.

As indicated above, FIG. 16 is a schematic plan view of a portion of the refiner-forehearth combination indicating the relative location of the skimmer 117 and the gas impingement manifold 61. FIG. 17 is an elevational view illustrating the depth of the glass 111 and the angle of incidence of the impinging gas. In this regard, the nozzles 81 were disposed at a negative angle.

The glass being prepared in the refiner-forehearth combination during this study had the following composition:

GLASS COMPOSITION*

| Component | Percent by Weight |
| --- | --- |
| $SiO_2$ | 72.289 |
| $Na_2O$ | 14.186 |
| CaO | 10.358 |
| $Al_2O_3$ | 1.685 |
| BaO | 0.499 |
| $K_2O$ | 0.387 |
| $SO_3$ | 0.282 |
| $Cr_2O_3$ | 0.123 |
| MgO | 0.103 |
| $Fe_2O_3$ | 0.046 |
| CuO | 0.026 |
| $TiO_2$ | 0.014 |
| $Co_3O_4$ | 0.003 |

*Density—2.5076; Softening Point—1,326° F.

The melting temperature of the glass was about 2,900° F.

The refiner-forehearth combination, when filled to capacity, contained approximately 17 tons of raw batch and molten glass. Glass was drawn from the forming end of the forehearth during operation of the gas impingement manifold at a rate of between about 35 and 55 tons per day.

The gas used in this study was air at a temperature of about 2,200° F. The nozzles were directed at an angle of −15° and were disposed about 3 inches above the molten glass.

Figure 18:
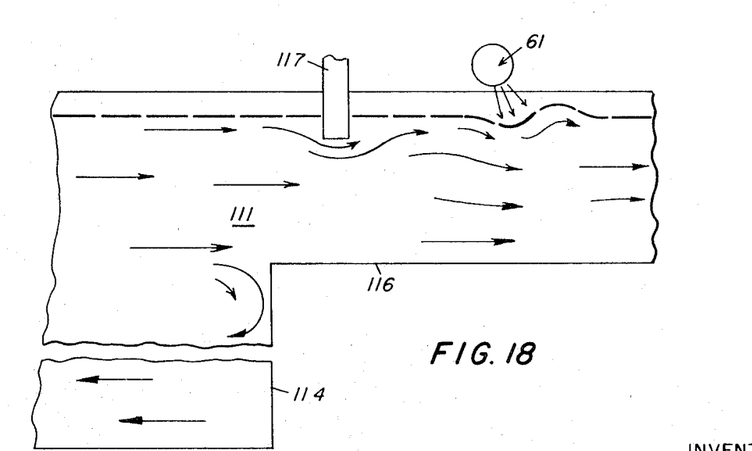
FIG. 18 is a schematic elevational view of a portion of the tank-manifold combination shown in FIG. 16 illustrating the glass flow patterns created by impinging gas at a negative angle.

Table I below represents data concerning the amount of striae and cords in the glass before and after operation of the present impingement manifold. Striae and cords were selected for investigation because they are a direct measure of the degree of homogeneity of the glass. As indicated in table I, the manifold was operated at several different conditions. All operating conditions resulted in a visible disruption of the molten glass surface in the immediate area of gas impingement. In addition, all operating conditions caused flow patterns in the glass as schematically illustrating in FIG. 18. At no time during the study did the nozzles deteriorate due to excess heat or to thermal expansion of the manifold.

TABLE I

| Run No.: | Height of Nozzle Outlets, degrees above glass | Gas pressure, o.s.i.g. | Angle of incidence, degrees | Composition of striae, percent alumina rich | Number of cords per sample | Percent glass containing striae | Maximum striae thickness, microns | Average striae thicknesss micron, |
| --- | --- | --- | --- | --- | --- | --- | --- | --- |
| 1 | (1) | 0 | 0 | 1.0 |  | 60 | 32 | 15 |
| 2 | 3″ | 25 | −15 | 1.0 | 15 | 60 | 25 | 15 |
| 3 | 3″ | 90 | −15 | 0.3 |  | 10 | 5 | 5 |
| 4 | 3″ | 120 | −15 | 0.1 | 1 to 1.8 | 5 | 5 | 5 |

¹ Before operation of manifold.

This study clearly demonstrated the effectiveness of the present invention in reducing striae and cords. It also illustrates the exceptional ability of the present manifold to assist in obtaining high quality bottle glass without sacrificing throughput.

EXAMPLE II

As indicated hereinabove, a uniform gas impact pressure on the glass surface is desirable in order to avoid nonuniform attenuation. In this connection, it will be appreciated that any impact pressure having a force component acting transverse to the direction of flow of the glass may cause local turbulence or folding which will disturb plano-parallel rear surfaces. Such folding will ordinarily impair to usefulness of the resultant glass product, and is particularly undesirable in sheet glass. Thus, for the purpose of comparison and to illustrate the more uniform gas impingement pressures attainable with the present invention, the impact pressure profile of the manifold described in example I was compared with that of the prior art manifold illustrated in FIGS. 5–7. The prior art manifold consisted of a 3½ inch outside diameter pipe with 7/16-inch Fiberfrax covering. There were 221 nozzles, one-half inch apart, each with an inside diameter of one-eighth inch.

The gas used in this study was compressed air introduced into the manifolds at a temperature of about 250° F. The air was introduced through the respective manifolds at about 70 osig. The nozzle outlets of each manifold were maintained at a predetermined distance above the surface of molten glass and the impingement pressure across the transverse expanse of glass surface was recorded.

A comparison of the profiles immediately after startup indicated that both the present manifold and the prior art manifold provided sufficiently uniform gas impingement pressures for proper attenuation. However, a comparison after 45 days in operation revealed a serious decline in the uniformity of pressure profile obtained with the prior art manifold. More specifically, the impact pressure of the prior art manifold varied by more than 100 percent of its minimum value over the length of the apparatus, as compared to a variation of only about 25 percent for the present manifold. The smaller pressure variation exhibited by the present manifold is evidence of the greater durability of its water cooled nozzles. Thus, the present manifold not only improves nozzle life but also provides an economic, durable and facile means for effecting uniform attenuation of plano-parallel ream surfaces.

EXAMPLE III

The effect of a uniform gas temperature profile is to ensure a uniform glass surface temperature. In turn, a uniform glass temperature ensures a uniform glass viscosity and density, and thus prevents an undesirable destruction of the plano-parallelism of ream surfaces. This example, then, compares the gas temperature gradient or temperature drop per unit length of pipe for both the prior art manifold and the present manifold. In effect, this example provides a measure of the effect of the gas bleed of the present manifold.

The gas used in this study was combustion products form an air-gas burner at a temperature of about 1,800° F. The manifold, embodying the principles of the present invention and that embodying the prior art were those described in example II.

After reaching a steady state condition, the temperature gradient exhibited by the prior art manifold was about 5° per inch of pipe. The nonuniform cooling effect on molten glass of the impinged gas would be sufficient to cause a viscosity gradient of from about 5 percent to 8 percent per inch, and thus cause significant relative motion in a plane of the molten glass parallel to the glass surface and transverse to the desired longitudinal direction of flow thereof. Such combined longitudinal and transverse flow of the glass would destroy the uniform attenuation of plano-parallel ream surfaces. On the other hand, the temperature gradient exhibited by the present manifold was only about 1° per inch of pipe. This relatively insignificant variation is due to the presence of a gas bleed in the manifold and would result in a glass viscosity gradient on the other of only 1 percent per inch. Accordingly, the present manifold should obviate nonuniform attenuation which is attributable to relative transverse motion in the glass surface.

tain defects normally occurring in glass operations. Table II is as follows.

TABLE II

|  | Without Manifold | After 19 days Prior Art Manifold | After 129 days Present Manifold |
|---|---|---|---|
| Seeds and Blisters | 2.6/100 ft.³ (acceptable) | 5–10/100 ft.³ and increasing (not acceptable) | acceptable |
| Yield | 84% pack | Yields decreased because of high defect density | 92%–94% pack |

As indicated in table II, the number of glass defects caused by the prior art manifold was intollerable. Table II also illustrates the significantly improved yield obtainable with the present manifold.

EXAMPLE V

The manner in which the gas nozzles of the present manifold are cooled adds significantly to the longevity of the manifold. Thus, when comparing the number of days in service from startup to noticeable nozzle deterioration, it became evident that great economies could be achieved by practicing the present invention. The results of such comparative studies are tabulated below in table III.

As clearly indicated by the data contained in table III, the present manifold offers a significant improvement in service time; a concurrent savings in maintenance and replacement expenses would necessarily follow.

While the present invention has been discussed in terms of specific examples, it should be understood that they are merely illustrative of the principles of the present invention and that the scope of the invention should be limited only by the language of the appended claims. For example, while the manifolds 61 and 101 have been described hereinabove as containing a single row of preferably equally spaced, equally sized diameter, circular nozzles as the means for directing the gas onto the surface of the molten glass, more than one row of nozzles can be used. The nozzles need not have circular cross sections, but can have oval, square, octagonal, triangular or any other shaped cross section as desired. The nozzles can even vary in cross section along the length of the manifolds.

In addition to a series of nozzles, the manifolds can be constructed using a single narrow slot of constant width or a series of short slots as the gas exit means.

The manifolds can also be fabricated with means for adjusting the size of the nozzles or slots, severally or collectively. A

TABLE III

|  | Run Number | | | | |
|---|---|---|---|---|---|
| | 1 | 2 | 3 | 4 | 5 |
| Pipe style | Conventional¹ | 1,800° WCN² | Conventional (SN)³ | 2,300° WCN | 2,300° WCN |
| Number of nozzles | 367 | 367 | 367 | 45 | 129 |
| Nozzle diameter, inches | ⅛ | ⅛ | ⅛ | ⅛ | ⅛ |
| Nozzle length to diameter ratio | 13.7 to 1 | 7 to 1 | 12 to 1 | 6 to 1 | 6 to 1 |
| Nozzle spacing, inches | ½ | ½ | ½ | ½ | ½ |
| Manifold test pressure, o.s.i.g | 70 | 66 | 69 | 70 | |
| Days in service | 7 | ⁴ 9 | 9 | ⁵ 129 | ⁶ 45 |
| Gas temperature, ° F | 1,800 | 1,800 | 1,800 | 2,300 | 2,300 |
| Height of nozzle ends above glass, inches | 3 | 3 | 3 | 3 | 3 |

¹ Conventional pipe style refers to the prior art style illustrated in Figure 5.
² WCN refers to the water cooled nozzle manifold of the present invention. The temperature preceding WCN refers to the design temperature of the nozzles.
³ Conventional (SN) refers to the prior art manifold of Figure 5 wherein the metal insert bar has a shoulder to retain nozzles.
⁴ Run No. 2 not shut-down because of nozzle deterioration.
⁵ Run No. 4 still in operation when Table III compiled.
⁶ After 35 days service, condition of nozzles is such that manifold may be returned to service.

EXAMPLE IV

The qualitatively comparative data in table II was obtained to illustrate the effect of the present manifold on yield and certain typical adjustable design would consist of two concentric water-cooled pipes having a common pattern of holes or slots which could be rotated with respect to each other to align the openings for maximum gas output or to disalign the openings to completely cut off the gas supply. At various positions in between, varying amounts of gas could be released.

Moreover, the cross section of the inner tube or principal gas supply header component of the manifolds can also be circular, oval, square, rectangular or any other shape as desired. The effective span can be arranged to cover an entire glass tank width or a portion thereof. The effective span of the manifolds can be straight, curved, V-shaped, wavy or even serrated, and the manifolds can even be curved in both the horizontal or vertical planes if such is found necessary to provide a specifically desired gas pressure or temperature profile.

We claim:

1. An apparatus for homogenizing a viscous liquid in a container which comprises means for impinging at least one stream of gas against the surface of the viscous liquid with a sufficient force to create a visible disruption of the surface of the viscous liquid in the immediate area of gas impingement, said means comprising:
   first inner tube means having an inlet end, an outlet end and at least one discharge aperture transversely disposed relative to the longitudinal axis thereof;
   second tube means substantially concentrically disposed about said first inner tube means and insulated therefrom, said second tube means having at least one opening therethrough in fluid communication with said discharge aperture;
   third tube means substantially concentrically disposed about said second tube means and spaced therefrom to define a substantially annular space therebetween, said third tube means having at least one opening therethrough in fluid communication with said discharge aperture;
   nozzle means fixedly mounted in the openings in said second and third tube means, said nozzle means having a longitdunial channel therethrough in fluid communication with the interior of said first tube means; and
   means for introducing a cooling fluid into said annular space between said second and third tubes for thereby cooling said nozzle means.

2. The apparatus according to claim 1, in which means are provided for disposing the exit end of the longitudinal channel of said nozzle means a preselected distance from the surface of the viscous liquid and in which means are provided for introducing gas at a preselected temperature and pressure into the interior of said first tube means.

3. The apparatus according to claim 1, in which said second tube means is provided with an end cap, said end cap having a bore therethrough aligned with the outlet end of said first tube means for bleeding a portion of the impingement gas from the interior thereof.

4. The apparatus according to claim 3, in which said first means is movably mounted relative to said second tube means such that when said first tube means is subjected to thermal expansion the outlet end thereof advances longitudinally relative to said second tube means.

5. The apparatus according to claim 4, in which the outlet end of said first tube means comprises a longitudinally extending necked-down portion which is slidably mounted in the bore in said end cap.

6. The apparatus according to claim 5, in which said first tube means comprises at least two axially aligned heat-resistant ceramic tubes and in which resilient means are provided between the outlet end of said first tube means and the end cap of said second tube means for continuously urging the axially aligned ceramic tubes into pressing engagement.

7. The apparatus according to claim 6, in which said resilient means comprises a spring concentrically disposed about the longitudinally extending necked-down portion of said first tube means.

8. The apparatus according to claim 4, in which a gas exhaust tub means is disposed between the outlet end of said first tube means and the end cap of said second tube means, said exhaust tube means including a longitudinally extending necked-down portion slidably mounted in the bore in said end cap.

9. The apparatus according to claim 7, in which the exhaust tube is composed of a heat resistant ceramic material.

10. The apparatus according to claim 8, in which said first tub means comprises at least two axially aligned heat-resistant ceramic tubes and in which resilient means are disposed between the necked-down portion of said exhaust tube and the end cap of said second tube means for continuously urging the axially aligned ceramic tubes into pressing engagement.

11. The apparatus according to claim 10, in which said resilient means comprises a spring concentrically disposed about the longitudinally extending necked-down portion of said exhaust tub means.

12. The apparatus according to claim 1, which the discharge aperture in said first tube means comprises a longitudinal slot.

13. The apparatus according to claim 11, in which the discharge aperture in said first tube means comprises a longitudinal slot.

14. The apparatus according to claim 1, in which means are provided for axially rotating said third tube means for thereby varying the angle of incidence at which the gas stream discharging from said nozzle means impinges on the surface of the viscous liquid.

15. The apparatus according to claim 1, in which means are provided for axially rotating said third tube means for thereby varying the angle of incidence at which the gas stream discharging from said nozzle means impinges on the surface of the viscous liquid.

16. The apparatus according to claim 1, in which means are provided in the annular space between said second and third tube means for defining at least two isolated cooling compartments and in which cooling fluid is introduced into one of the isolated compartments and removed from the other.

17. The apparatus according to claim 11, in which means are provided in the annular space between said second and third tube means for defining at least two isolated cooling compartments and in which cooling fluid is introduced into one of the isolated compartments and removed from the other.

18. An apparatus for treating a moving body of fined molten glass just prior to leaving the refining zone of an elongated tank, which comprises:
   an axially rotatable gas manifold means mounted substantially transversely to the longitudinal extension of the tank for impinging gas against the surface of the moving body of fined molten glass with a force sufficient to create a visible disruption of the molten glass surface in the immediate area of gas impingement, said gas manifold means comprising:
   first inner tube means having an inlet, an outlet and at least one gas discharge aperture through a sidewall thereof;
   second tube means substantially concentrically disposed about said first tube means and insulated therefrom, said second tube means having at least one opening therethrough in fluid communication with said gas discharge aperture;
   third tube means substantially concentrically disposed about said second tube means and spaced therefrom to define a substantially annular space therebetween, said third tube means having at least one opening therethrough in fluid communication with said discharge aperture;
   nozzle means fixedly mounted in the openings in said second and third tube means, said nozzle means having a longitudinal channel therethrough in fluid communication with said discharge aperture;
   means for introducing a cooling fluid into the annular space between said second and third tubes;
   means for disposing the end of the nozzle means a preselected distance from the surface of the moving body of fined molten glass;

means for introducing gas at a preselected pressure and temperature into the interior of said first tube means, whereupon a portion of the gas discharges through said nozzle means and impinges on the surface of the moving glass, while an additional portion of the gas bleeds through the outlet of said first tube means; and means for axially rotating said third tube means.

19. The apparatus according to claim 18, in which said first tube means includes a plurality of discharge apertures disposed in a substantially symmetrical pattern relative to the opposing sidewalls of the elongated tank, and in which said second and third tube means each have a plurality of openings in fluid communication with said discharge apertures.

20. The apparatus according to claim 19, in which said plurality of discharge apertures extend in a symmetrical pattern from a central point between the opposing walls of the furnace to a location short of each wall.

21. The apparatus according to claim 18, in which the discharge aperture in said first tube means comprises an elongated slot, and in which said second and third tube means each have a plurality of openings in fluid communication with said slot, said openings being disposed in a substantially symmetrical pattern for a central point between the opposing walls of the furnace to a location short of each wall.

22. The apparatus according to claim 21, in which said second tube means is provided with an end cap having a bore therethrough axially aligned with said first tube means for bleeding a portion of the impingement gas from the interior thereof, and in which said first tube means is movably mounted relative to said second tube means such that when said first tube means is subjected to thermal expansion the outlet end thereof advances axially relative to said second tube means.

23. The apparatus according to claim 22, in which the outlet end of said first tube means comprises a longitudinally extending necked-down portion which is slidably mounted in the bore in said end cap.

24. The apparatus according to claim 22, in which a gas exhaust tube means is disposed between the outlet end of said first tube means and said end cap, said exhaust tube means including a longitudinally extending necked-down portion slidably mounted in the bore in said end cap.

25. The apparatus according to claim 24, in which said first tube means comprises at least two axially aligned heat-resistant ceramic tubes in which resilient means are provided between the necked-down portion of said exhaust tube means and said end cap for continuously urging the axially aligned ceramic tubes into pressing engagement.

26. The apparatus according to claim 25, in which said resilient means comprises a spring concentrically disposed about the longitudinally extending necked-down portion of said exhaust tube means.

27. An apparatus for conditioning a moving body of fined molten glass in a relatively shallower and narrower forehearth region of a continuous tank having a relatively broader and deeper refining zone contiguous with said forehearth region, which comprises:

an axially rotatable means mounted manifold means mounted substantially transversely to the longitudinal extension of the tank for impinging gas against the surface of the moving body of fined molten glass with a force sufficient to create a visible disruption of the molten glass surface to the immediate area of gas impingement, said gas manifold means comprising:

first inner tube means having an inlet end, an outlet end and at least one gas discharge aperture through a sidewall thereof;

second tube means substantially concentrically disposed about said first tube means and insulated therefrom, said second tube means having at least one opening therethrough in fluid communication with said gas discharge aperture;

third tube means substantially concentrically disposed about said second tube means and spaced therefrom to define a substantially annular space therebetween, said third tube means having at least one opening therethrough in fluid communication with said discharge aperture;

nozzle means fixedly mounted in the openings in said second and third tube means, said nozzle means having a longitudinal channel therethrough in fluid communication with said discharge aperture;

means for introducing a cooling fluid into the annular space between said second and third tube means; and means for axially rotating said third tube means.

28. The apparatus according to claim 27, in which said first tube means includes a plurality of discharge apertures disposed in a substantially symmetrical pattern relative to the opposing sidewalls of the forehearth region and in which said second and third tube means each have a plurality of openings in fluid communication with said discharge apertures.

29. The apparatus according to claim 28, in which said plurality of discharge apertures extend in a symmetrical pattern from a central point between the opposing walls of the furnace to a location short of each wall.

30. The apparatus according to claim 27, in which the discharge aperture in said first tube means comprises an elongated slot and in which said second and third tube means each have a plurality of openings in fluid communication with said slot, said openings being disposed in a substantially symmetrical pattern from a central point between the opposing walls of the furnace to a location short of each wall.

31. The apparatus according to claim 29, in which said second tube means is provided with an end cap having a bore therethrough axially aligned with the outlet end of said first tube means for bleeding a portion of the impingement gas from the interior thereof, and in which said first tube means is movably mounted relative to said second tube means such that when said first tube means is subjected to thermal expansion the outlet end thereof advances axially relative to said second tube means.

32. The apparatus according to claim 31, in which a gas exhaust tube means is disposed between the outlet end of said first tube means and said end cap, said exhaust tube means including a longitudinally extending necked-down portion slidably mounted in the bore in said end cap.

33. The apparatus according to claim 32, in which said first tube means comprises at least two axially aligned heat resistant ceramic tubes and in which resilient means are provided between the necked-down portion of said exhaust tube means and said end cap for continuously urging the axially aligned ceramic tubes into pressing engagement.

34. The apparatus according to claim 33, in which said resilient means comprises a spring concentrically disposed about the longitudinally extending necked-down portion of said exhaust tube means.

35. In an apparatus for conditioning molten glass in a continuous tank having a relatively broad and deep fining region and a relatively narrow and shallow forehearth region, wherein the molten glass has a forward flow at the surface thereof and a return flow therebelow, the improvement which comprises:

an axially rotatable gas impingement manifold mounted substantially transversely of the direction of glass flow and disposed a predetermined distance above the surface of the flowing glass in the forehearth region of said tank, said manifold comprising:

first inner tube means having an inlet end, an outlet end and at least one gas discharge aperture through a sidewall thereof;

second the tube means substantially concentrically disposed about said first tube means and insulated therefrom, said second tube means having at least one opening therethrough in fluid communication with said gas discharge aperture;

third tube means substantially concentrically disposed about said second tube means and spaced therefrom to define a substantially annular space therebetween, said third tube means having at least one opening therethrough in fluid communication with said discharge aperture;

nozzle means fixedly mounted in the openings in said second and third tube means, said nozzle means having a longitudinal channel therethrough in fluid communication with said discharge aperture;

means for introducing a cooling fluid into the annular space between said second and third tubes; and means for axially rotating said third tube means;

means for disposing the end of the nozzle means a preselected distance from the surface of the moving body of fined molten glass; and means for introducing a gas at a preselected pressure and temperature into said first tube means of said manifold, whereupon a portion of the gas discharges through said nozzle means and impinges on the surface of the flowing glass, while an additional portion of the gas bleeds through the outlet end of said first tube means.

36. The apparatus according to claim 35, in which said first tube means comprises at least two axially aligned heat resistant ceramic tubes, in which said second tube means is provided with an end cap having a bore therethrough axially aligned with the outlet end of said first tube means, in which said first tube means is movably mounted relative to said second tube means such that when said first tube means is subjected to thermal expansion the outlet end thereof advances longitudinally relative to said second tube means, in which a gas exhaust tube means having a longitudinally extending necked-down bleed portion is mounted between said end cap and the outlet end of said first tube means for sliding movement in the bore in said end cap, and in which resilient means are provided between the necked-down portion of said exhaust tube and said end cap for continuously urging the axially aligned ceramic tubes into pressing engagement.

37. The apparatus according to claim 36, in which said resilient means comprises a spring concentrically disposed about the longitudinally extending necked-down portion of said exhaust tube means.

38. The apparatus according to claim 37, in which the discharge aperture in said first tube means comprises an elongated slot and in which said second and third tube means each have a plurality of openings in fluid communication with said slot and disposed in a substantially symmetrical pattern from a central point between the opposing walls of the furnace to a location short of each wall.

* * * * *

UNITED STATES PATENT OFFICE
CERTIFICATE OF CORRECTION

Patent No. 3,617,234                     Dated    November 2, 1971

Inventor(s)  CHARLES T. HAWKINS and EUGENE W. STARR

It is certified that error appears in the above-identified patent
and that said Letters Patent are hereby corrected as shown below:

Column 2, line 22, "longitudinal" should read -- on --.
Column 3, line 1, after "is" insert -- in --.
Column 4, line 17, after "glass", change "floates" to -- floats --;
Column 4, line 49, change "homogenous," to -- homogeneous --;
Column 4, line 70, "+30°" should read -- +80° --.
Column 5, line 2, "throughout" should read -- throughput --;
Column 5, line 58, "("osig")" should read -- "osig." --.
Column 6, line 6, after "attenuation" change the comma (,) to a
    period (.).
Column 7, line 14, "Iconel" should read -- Inconel --.
Column 8, line 72, "21/6" should read -- 2 1/6 --.
Column 10, line 33, "illustrating" should read -- illustrated --;
Column 10, line 62, "to" should read -- the --;
Column 10, line 67, "example" should read -- Example --.
Column 11, line 32, "form" should read -- from --;
Column 11, line 34, "example" should read -- Example --;
Column 11, line 51, "other" should read -- order --;
Column 11, Table III, in footnote 6, "35" should read -- 45 --.
Column 12, line 18, "intollerable" should read -- intolerable --.
Column 13, line 37, "longitdunial" should read -- longitudinal --;
Column 13, line 54, after "first" insert -- tube --;
Column 13, line 74, "tub" should read -- tube --.
Column 14, line 7, "tub" should read -- tube --;
Column 14, line 15, "tub" should read -- tube --;
Column 14, line 26, "Claim 1" should read -- Claim 11 --.
Column 15, line 26, "for" should read -- from --;
Column 15, line 62, "means mounted" should read -- gas --.
Column 16, line 71, delete "the".

Signed and sealed this 6th day of February 1973.

(SEAL)

Attest:

EDWARD M. FLETCHER, JR.                    ROBERT GOTTSCHALK
Attesting Officer                          Commissioner of Patents